United States Patent [19]
Acevedo

[11] 3,787,979
[45] Jan. 29, 1974

[54] ORTHODONTIC DENTAL STUDY MODEL

[76] Inventor: Raul Acevedo, Arzuaga No. 9, Rio Piedras, San Juan, P.R.

[22] Filed: Feb. 2, 1973

[21] Appl. No.: 329,047

[52] U.S. Cl. ............................................... 32/71
[51] Int. Cl. ............................................. A61c 19/00
[58] Field of Search .................... 32/71, 40 R, 11

[56] References Cited
UNITED STATES PATENTS
| | | | |
|---|---|---|---|
| 1,205,437 | 11/1916 | Delabarre | 32/71 |
| 2,539,278 | 1/1951 | Schwehr et al. | 32/71 |
| 2,812,578 | 11/1957 | Weidenhamer | 32/71 |

*Primary Examiner*—Robert Peshock

[57] ABSTRACT

An orthodontic study device is provided wherein the position of each tooth may be universally adjusted. The tooth, in the form of a crown, is connected by a ball and socket joint to one end of a post which is secured at its other end to a supporting base plate. The post is in the form of elongated telescopic members whereby the height thereof may be adjusted. The post is secured to the base plate by a ball and socket joint whereby its position may be adjusted. Set screw means are provided to hold the telescoping members and the post in their adjusted positions. A selected number of devices and their crowns may be assembled in a dental arch formation with the crowns adjusted to desired positions to illustrate various spatial relationships of the teeth.

5 Claims, 9 Drawing Figures

ORTHODONTIC DENTAL STUDY MODEL

This invention relates to orthodontic study devices which may be used as teaching devices or for illustrating teeth conditions to patients.

An object of this invention is to provide a device wherein a tooth crown is mounted on a support by a universal connection, such as a ball and socket joint, whereby the crown may be universally positioned to illustrate various normal and abnormal positions of a tooth.

A further object is to support a tooth on a vertically adjustable support or post so that the height of adjacent teeth may be varied.

Another object is to secure the adjustable support to a supporting base plate by a universal connection whereby the position of the post relative to its base plate may be adjusted.

A further object is to provide a number of the above devices and to assemble them in a dental arch formation to illustrate desired spatial relationships of the teeth.

Other objects and advantages of the invention will be apparent from a reading of the following description in connection with the drawing wherein.

The orthodontic study device comprises a set of individual adjustable tooth supports which may be assembled in a dental arch.

Figure 1:
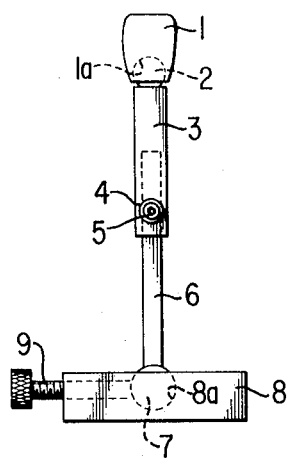
FIG. 1 is a side elevation view of the device supporting an incisor crown.
Figure 2:
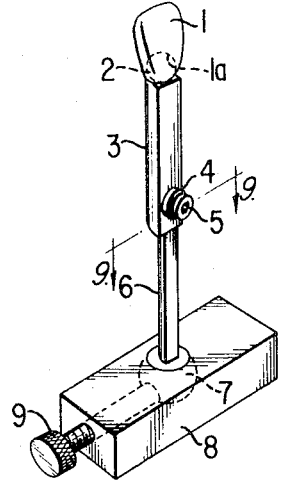
FIG. 2 is a perspective front view of FIG. 1.
Figure 3:
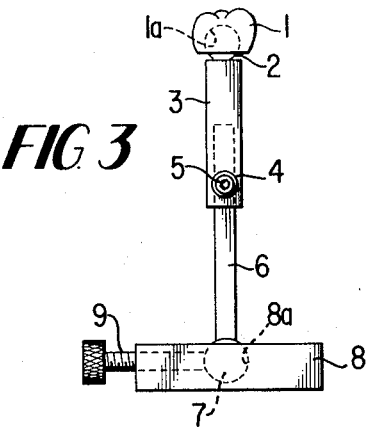
FIGS. 3 and 4 are views similar to FIGS. 1 and 2, respectively, except that the device supports a molar crown.
Figure 4:
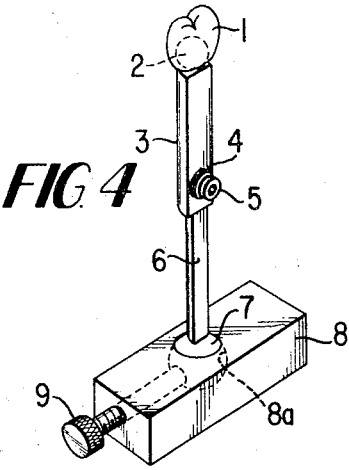

As illustrated in FIGS. 1–4, each tooth support comprises a tooth 1 supported for universal movement on a universal joint means which may be in the form of a ball and socket joint. While tooth 1 may be of any tooth formation, it is preferred that it is in the form of a hollow crown having a socket formation 1a therein which cooperates with a ball 2 to form a ball and socket joint. The outer surface of tooth 1 may be molded or shaped to represent a desired tooth, such as an incisor (FIGS. 1 and 2) or a molar (FIGS. 3 and 4). The tooth may be made of any suitable material, such as plastic or stone.

Figure 9:
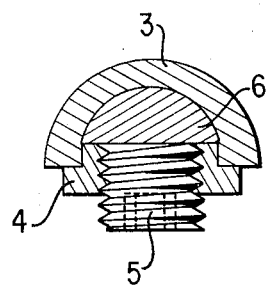
FIG. 9 is a sectional view taken on line 9–9 of FIG. 2.
Figure 5:
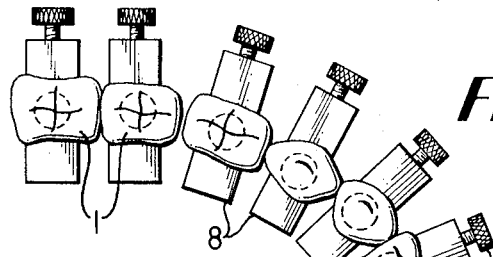
FIG. 5 is a top view of an assembly of devices, the crowns being encompassed within a dental arch structure.
Figure 6:
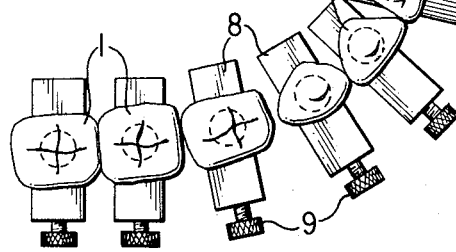
FIG. 6 is an end elevation view of the assembly of device illustrated in FIG. 5.
Figure 7:
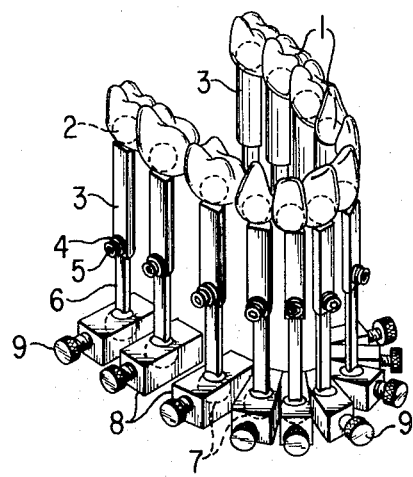
FIG. 7 is a perspective front view of an asembly of the devices in a dental arch formation.

Ball 2 is secured to the top of a vertically adjustable post comprising telescopic members 3 and 6. The ball is soldered or otherwise secured to the hollow tube-like member 3 slidable or telescoping upon the rod member 6. To prevent relative rotation between telescoping members 3 and 6, a non-circular section is utilized for members 3 and 6. As illustrated in FIG. 9, the cross sections of members 3 and 6 are semi-circular. A nut 4 is secured on the flat side of member 3 and a set screw 5 is threaded into the nut whereby screw 5 can be advanced through an opening in member 3 to engage the flat side of rod 6 and thereby hold members 3 and 6 in their adjusted position. To facilitate quick adjustment, screw 5 may also be in the form of a thumb screw.

A ball 7 is secured to rod 6. The ball cooperates with a socket 8a formed in a supporting base 8. Base 8 may be in the form of a rectangular plate which serves as a firm support to the post and the tooth mounted thereon. Thus, ball 2 may represent the coronal joint and ball 7 the basal joint.

Ball 7 and socket 8a form a universal joint whereby the post and the tooth may be moved to any desired spatial position. To maintain the post in the selected position, a screw 9 is threaded into plate 8 and engages ball 7 to hold it and the post in the selected position. To facilitate the operation of screw 9 it may be a conventional thumb screw with a knurled head to provide easy manual manipulation thereof.

As illustrated in FIGS. 5 to 8, the individual teeth and their supports may be assembled in a dental arch formation. Since each tooth is in the form of a shaped crown which is connected to its support by a universal joint, each tooth of the assembly in the arch formation may be adjusted individually to portray mesial and distal axial inclinations correctly to any degree. Further, by proper adjustment increases and decreases in the width of the apical or basal arch, or in any segment, can also be portrayed. Cross-bites in the posterior teeth may also be illustrated. In general, by adjusting the position of an individual tooth on its ball 2 and adjusting the height of the individual teeth and by positioning the post and its ball 7 relative to plate 8, any normal or abnormal spatial relation between the various teeth may be illustrated.

Figure 8:
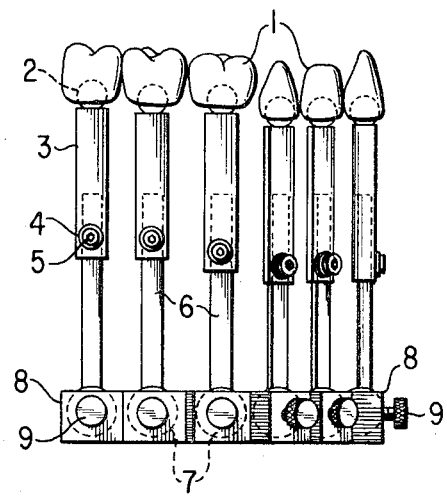
FIG. 8 is a perspective front view of another embodiment of the invention wherein a single base plate supports an assembly of posts and their supported crowns; in a dental arch formation.
Figure 8:
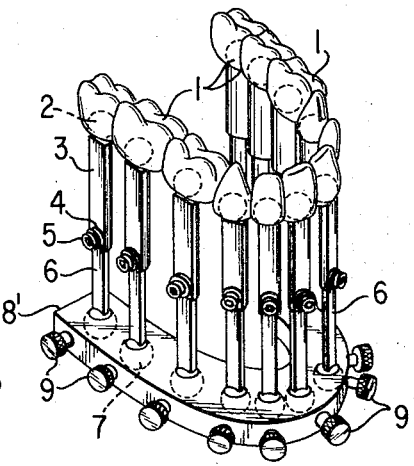

FIG. 8 illustrates another embodiment of the invention. Instead of utilizing individual base plates 8 to support each tooth, as in FIGS. 1 to 7, a common integral base plate 8$^1$ in the form of an arch is utilized. The several posts and their balls 7 fit into respective sockets 8a formed in base plate 8. Thumb screws 9 are threaded in base plate 8$^1$ to provide a holding means for each of the balls 7.

It is obvious that various changes may be made in the construction and arrangement of the several elements of the disclosed invention without departing from the spirit thereof.

What is claimed is:

1. An orthodontic study device useful as a teaching device or for illustrating teeth conditions to a patient, comprising:

a base plate;

a vertically adjustable post adapted to hold a tooth crown, said post secured by pivotal means at one end to said base plate and adapted to support a tooth crown at the other end;

a tooth crown which represents a desired tooth formation pivotally supported at said other end of said post;

a ball and socket joint means constituting the pivotal interconnection between said vertically adjustable post and said tooth crown supported by said post;

the ball of said ball and socket joint means being secured to the end of said post while the socket of said ball and socket means is formed within said tooth crown; and, said vertically adjustable post comprising a pair of tubular telescopic members and screw means to tighten said telescopic members and thereby hold the members in a pre-set position which project the tooth at the desired height in relation to the base while the ball and socket means permits angular adjustment in a full circumference about the pivoting center of said ball and socket means and said post thereby permitting assembly of a plurality of posts, tooth crowns, and ball and socket joint means to illustrate desired spatial relationships in a dental arch structure.

2. An orthodontic study device as claimed in claim 1 wherein said telescopic members are of a non-circular cross-section which prevents relative rotation between each of said telescopic members.

3. The orthodontic study device set forth in claim 2 wherein said post which is connected to said base plate is secured thereto by means of a universal joint permitting adjusting movement about an entire circle at said joint to thereby further adapt the positioning of said post and tooth attached thereto.

4. The orthodontic study device as set forth in claim 3 wherein said universal joint comprises a ball and socket means connecting one end of said post to said base plate and wherein threaded means is provided to hold the post into a set and adjusted position relative to said base plate.

5. The orthodontic study device as set forth in claim 4 wherein a plurality of base plates are united forming thereby a common base plate which is integral and which has plurality of posts associated therewith mounted thereon in the form of a dental arch formation.

* * * * *